US012271141B2

(12) United States Patent
Itabashi

(10) Patent No.: US 12,271,141 B2
(45) Date of Patent: *Apr. 8, 2025

(54) IMAGE FORMING APPARATUS

(71) Applicant: BROTHER KOGYO KABUSHIKI KAISHA, Nagoya (JP)

(72) Inventor: Nao Itabashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,014

(22) Filed: Oct. 9, 2023

(65) Prior Publication Data

US 2024/0036507 A1 Feb. 1, 2024

Related U.S. Application Data

(63) Continuation of application No. 17/733,023, filed on Apr. 29, 2022, now Pat. No. 11,880,159, which is a continuation of application No. 17/215,611, filed on Mar. 29, 2021, now Pat. No. 11,347,176, which is a continuation of application No. 16/793,100, filed on (Continued)

(30) Foreign Application Priority Data

Sep. 28, 2018 (JP) ................................ 2018-184469

(51) Int. Cl.
*G03G 21/16* (2006.01)

(52) U.S. Cl.
CPC ..... *G03G 21/1604* (2013.01); *G03G 21/1671* (2013.01); *G03G 21/1676* (2013.01)

(58) Field of Classification Search
CPC .......... G03G 21/1671; G03G 21/1676; G03G 15/0872; G03G 21/185; G03G 2215/0665
See application file for complete search history.

(56) References Cited

U.S. PATENT DOCUMENTS 4,309,779 A 1/1982 Knight
5,341,200 A 8/1994 Thomas
(Continued)

FOREIGN PATENT DOCUMENTS

EP 2 296 061 A2 3/2011
JP 60-211472 A 10/1985
(Continued)

OTHER PUBLICATIONS

Office Action (Notice of Reasons for Refusal) issued in corresponding Japanese Patent Application No. 2023-002578, Nov. 14, 2023.
(Continued)

*Primary Examiner* — Sevan A Aydin
(74) *Attorney, Agent, or Firm* — Merchant & Gould P.C.

(57) ABSTRACT

An image forming apparatus includes a main body casing, a drum cartridge, a developing cartridge and an intermediate transfer belt. The drum cartridge is removably insertable into to the main body casing in a first direction. The developing cartridge is removably insertable into the main body casing in the first direction. The drum cartridge includes a first handle. The first handle has a first recess having a first hollow. The developing cartridge includes a second handle. The second handle has a second recess having a second hollow.

16 Claims, 14 Drawing Sheets

Related U.S. Application Data

Feb. 18, 2020, now Pat. No. 10,969,729, which is a continuation of application No. PCT/JP2019/016287, filed on Apr. 16, 2019.

(56) References Cited

U.S. PATENT DOCUMENTS

| | | | |
|---|---|---|---|
| 5,678,315 A | 10/1997 | Hartzell | |
| 6,289,557 B1 | 9/2001 | Manson et al. | |
| 6,484,329 B1 | 11/2002 | Duncan | |
| 10,969,729 B2 * | 4/2021 | Itabashi | G03G 15/0896 |
| 2004/0184835 A1 | 9/2004 | Park | |
| 2009/0080934 A1 | 3/2009 | Nakanishi et al. | |
| 2010/0080622 A1 | 4/2010 | Uchida | |
| 2010/0127003 A1 | 5/2010 | Alvares et al. | |
| 2010/0215395 A1 | 8/2010 | Funada et al. | |
| 2010/0215407 A1 | 8/2010 | Funada et al. | |
| 2010/0221045 A1 | 9/2010 | Hattori et al. | |
| 2014/0037332 A1 | 2/2014 | Kamimura | |
| 2014/0086629 A1 | 3/2014 | Fujiwara et al. | |
| 2016/0216684 A1 | 7/2016 | Kobayashi et al. | |
| 2016/0333624 A1 | 11/2016 | Choi | |
| 2017/0023878 A1 | 1/2017 | Uchida | |
| 2018/0120758 A1 | 5/2018 | Zensai et al. | |
| 2020/0229419 A1 | 7/2020 | Jemail | |

FOREIGN PATENT DOCUMENTS

| | | |
|---|---|---|
| JP | 6-266173 A | 9/1994 |
| JP | 2003-302807 A | 10/2003 |
| JP | 2004-101961 A | 4/2004 |
| JP | 2006-154500 A | 6/2006 |
| JP | 2006-248645 A | 9/2006 |
| JP | 2007-3660 A | 1/2007 |
| JP | 2009-75442 A | 4/2009 |
| JP | 2010-102303 A | 5/2010 |
| JP | 2010-197869 A | 9/2010 |
| JP | 2013-182103 A | 9/2013 |
| JP | 2013-257490 A | 12/2013 |
| JP | 2014-71140 A | 4/2014 |
| JP | 2015-112777 A | 6/2015 |
| JP | 2016-133762 A | 7/2016 |
| JP | 2017-26737 A | 2/2017 |
| JP | 2017-194533 A | 10/2017 |
| JP | 2018-72677 A | 5/2018 |

OTHER PUBLICATIONS

International Search Report issued in corresponding International Patent Application No. PCT/JP2019/016287, Jun. 11, 2019.

Written Opinion issued in corresponding International Patent Application No. PCT/JP2019/016287, Jun. 11, 2019.

Japanese Office Action issued in corresponding Japanese Patent Application No. 2018-184469, mailed Jul. 27, 2021.

Office Action issued in the corresponding Japanese Patent Application No. 2023-002578, Mar. 12, 2024.

Office Action issued in the corresponding Japanese Patent Application No. 2023-002578, Aug. 20, 2024.

* cited by examiner

IMAGE FORMING APPARATUS

CROSS-REFERENCE TO RELATED APPLICATIONS

This is a continuation of U.S. patent application Ser. No. 17/733,023, filed Apr. 29, 2022, which is a continuation U.S. patent application Ser. No. 17/215,611, filed Mar. 29, 2021, now U.S. Pat. No. 11,347,176, which is a continuation of U.S. patent application Ser. No. 16/793,100, now U.S. Pat. No. 10,969,729, filed Feb. 18, 2020, which is a continuation of International Application No. PCT/JP2019/016287, filed Apr. 16, 2019, which claims priority from Japanese Patent Application No. 2018-184469, filed Sep. 28, 2018. The entire contents of the earlier applications are incorporated herein by reference.

TECHNICAL FIELD

Aspects of the disclosure relate to an image forming apparatus including a drum cartridge and a developing cartridge, each of which is removably insertable to a main body casing of the image forming apparatus.

BACKGROUND

Some known image forming apparatus is configured such that a drum cartridge and a developing cartridge are each insertable into and removable from a main body casing of the image forming apparatus in a first direction extending parallel to an axial direction of a photosensitive drum. Such a drum cartridge and a developing cartridge are insertable into and removable from the main body casing, respectively. The drum cartridge and the developing cartridge each include a protrusion at one of side surfaces thereof in the first direction. Each protrusion may be held by a user. A user may pull the drum cartridge and the developing cartridge individually by holding the respective protrusions with fingers.

SUMMARY

Nevertheless, the known configuration might not enable a user to pull the respective cartridges easily.

Accordingly, aspects of the disclosure provide an image forming apparatus having a configuration that may enable a user to easily pull a cartridge in a first direction.

According to an illustrative embodiment of the present disclosure, there is provided an image forming apparatus including a main body casing, a drum cartridge, a developing cartridge and an intermediate transfer belt. The drum cartridge is removably insertable into to the main body casing in a first direction. The drum cartridge includes a photosensitive drum and a drum frame. The photosensitive drum is rotatable about a first axis extending in the first direction. The drum farme is rotatably supporting the photosensitive drum. The developing cartridge is removably insertable into the main body casing in the first direction. The developing cartridge includes a developing roller and a developing frame. The developing roller is rotatable about a second axis extending in the first direction. The developing frame is configured to store developer therein. The intermediate transfer belt is positioned above of the drum cartridge and the developing cartridge in a state where the drum cartridge and the developing cartridge are attache to the main body casing. The drum cartridge includes a first handle. The first handle is positioned at a first drum outer surface of the drum frame in the first direction. The first handle has a first recess having a first hollow. The developing cartridge includes a second handle. The second handle is positioned at a first developing outer surface of the developing frame in the first direction. The second handle has a second recess having a second hollow.

DETAILED DESCRIPTION

An illustrative embodiment will be described with reference to the accompanying drawings. A description will be first provided on an overall configuration of a color printer 1 as an example of an image forming apparatus.

Figure 1:
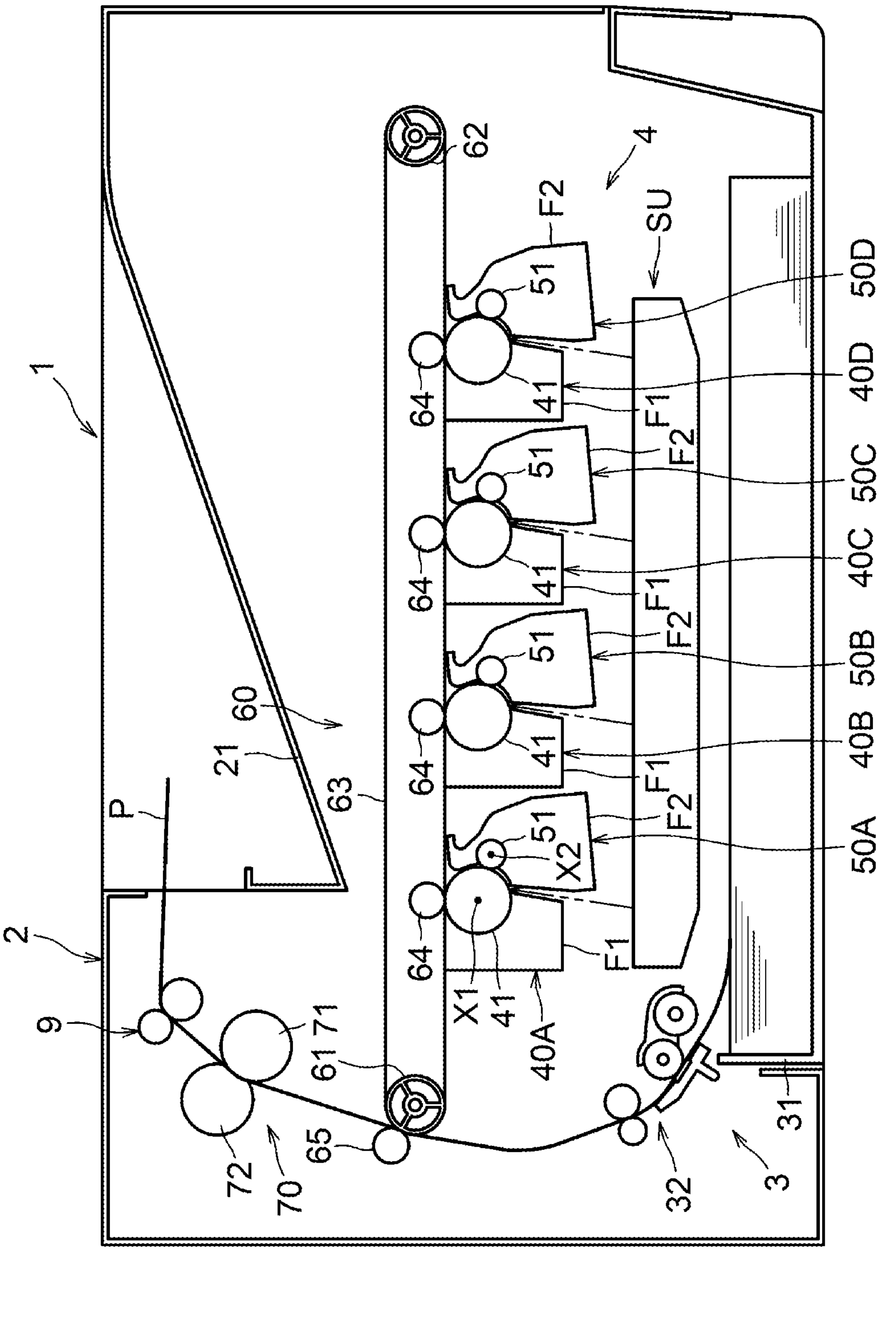
FIG. 1 is a sectional view illustrating a general configuration of a color printer according to an illustrative embodiment of the disclosure.

As illustrated in FIG. 1, the color printer 1 includes a main body casing 2, a feed unit 3, an image forming unit 4, and a discharge unit 21. The feed unit 3 is configured to feed a sheet S to the image forming unit 4. The image forming unit 4 is configured to form an image onto a sheet S. The discharge unit 21 is configured to discharge a sheet S to the outside of the main body casing 2.

The discharge unit 21 is positioned at an upper portion of the main body casing 2. The discharge unit 21 is positioned above an intermediate transfer belt 63. The discharge unit 21 includes discharge rollers 9 and a sheet receiving surface. The discharge rollers 9 are configured to convey a sheet S toward the sheet receiving surface.

The feed unit 3 is positioned in a lower portion of the main body casing 2. The feed unit 3 includes a feed tray 31 and a feed mechanism 32. The feed tray 31 is insertable into and removable from the main body casing 2. The feed mechanism 32 is configured to feed a sheet S from the feed tray 31 to the image forming unit 4.

The image forming unit 4 includes a first drum cartridge 40A, a second drum cartridge a third drum cartridge 40C, and a fourth drum cartridge 40D, a first developing cartridge 50A, a second developing cartridge 50B, a third developing cartridge 50C, a fourth developing cartridge an exposure device SU, a transfer unit 60, and a fixing unit 70.

Each drum cartridge 40A, 40B, 40C, 40D includes a photosensitive drum 41, a drum frame F1, and a charger. The photosensitive drum 41 is rotatable about a first axis X1 extending in a first direction. In a state where the drum cartridges 40A, 40B, 40C, and 40D are attached to the main body casing 2, the drum cartridges 40A, 40B, 40C, and 40D are next to each other in a second direction perpendicular to the first direction and an up-down direction.

In a state where the drum cartridges 40A, 40B, 40C, and 40D and the developing cartridges 50A, 50B, 50C, and 50D are attached to the main body casing 2, the drum cartridges 40B, 40C, and 40D and the developing cartridges 50A, 50B, 50C, and 50D are alternately arranged in the second direction.

The first drum cartridge 40A is closer to a drive roller 61 than the second drum cartridge is to the drive roller 61 in the second direction. The second drum cartridge 40B is closer to the drive roller 61 than the third drum cartridge 40C is to the drive roller 61 in the second direction. The third drum cartridge 40C is closer to the drive roller 61 than the fourth drum cartridge 40D is to the drive roller 61 in the second direction.

The developing cartridges 50A, 50B, 50C, and 50D store developer of respective different colors. Each developing cartridge 50A, 50B, 50C, 50D includes a developing roller 51 and a developing frame F2. The developing frame F2 stores developer. The developing roller 51 is rotatable about a second axis X2 extending in the first direction. In a state where the developing cartridges 50A, 50B, 50C, and 50D are attached to the main body casing 2, the developing cartridges 50A, 50B, 50C, and 50D are next to each other in the second direction. Each developing cartridge 50A, 50B, 50C, 50D is movable between a contact position at which the developing roller 51 is in contact with a corresponding photosensitive drum 41 (e.g., the position of the developing roller 51 in FIG. 1) and a separated position at which the developing roller 51 is separate from the corresponding photosensitive drum 41 (e.g., the position of the developing roller 51 in FIG. 8). Such a movement of each developing cartridge 50A, 50B, 50C, 50D between the contact position and the separated position may be implemented by a specific mechanism.

The first developing cartridge 50A is positioned between the first drum cartridge 40A and the second drum cartridge 40B in the second direction. The second developing cartridge 50B is positioned between the second drum cartridge 40B and the third drum cartridge 40C in the second direction. The third developing cartridge 50C is positioned between the third drum cartridge 40C and the fourth drum cartridge 40D in the second direction. The fourth developing cartridge 50D is farther from the drive roller 61 than the fourth drum cartridge 40D is from the drive roller 61 in the second direction.

The exposure device SU is positioned below the drum cartridges 40A, 40B, 40C, and 40D. The exposure device SU is configured to irradiate a circumferential surface of each photosensitive drum 41 with a laser beam.

The transfer unit 60 is positioned between the photosensitive drums 41 and the discharge unit 21 in the up-down direction. The transfer unit 60 includes the drive roller 61, a driven roller 62, the intermediate transfer belt 63, a plurality of, for example, four, first transfer rollers 64, and a second transfer roller 65.

The intermediate transfer belt 63 may be an endless belt. In a state where the drum cartridges 40A, 40B, 40C, and 40D and the developing cartridges 50A, 50B, 50C, and 50D are attached to the main body casing 2, the intermediate transfer belt 63 is positioned above the drum cartridges 40A, 40B, 40C, and 40D and the developing cartridges 50A, 50B, 50C, and 50D. The drive roller 61 and the driven roller 62 are positioned inside the loop of the intermediate transfer belt 63. The intermediate transfer belt 63 is supported by the drive roller 61 and the driven roller 62 under tension.

The first transfer rollers 64 are positioned inside the loop of the intermediate transfer belt 63. The first transfer rollers 64 and the respective corresponding photosensitive drums 41 sandwich the intermediate transfer belt 63 therebetween.

The second transfer roller 65 is positioned outside the loop of the intermediate transfer belt 63. The second transfer roller 65 and the drive roller 61 sandwich the intermediate transfer belt 63 therebetween.

The fixing unit 70 is positioned above the intermediate transfer belt 63. The fixing unit 70 includes a heat roller 71 and a pressure roller 72. The pressure roller 72 is configured to be pressed toward the heat roller 71.

In the color printer 1, first, the charger charges the circumferential surface of each photosensitive drum 41. Thereafter, the exposure device SU exposes the circumferential surface of each photosensitive drum 41. Thus, an electrostatic latent image is formed on the circumferential surface of each photosensitive drum 41.

After that, each developing roller 51 supplies developer onto the electrostatic latent image formed on a corresponding photosensitive drum 41, thereby forming a developer image on the circumferential surface of each photosensitive drum 41. Each first transfer roller 64 then transfers the developer image onto an outer circumferential surface of the intermediate transfer belt 63 from the circumferential surface of the corresponding photosensitive drum 41.

When a sheet S passes between the intermediate transfer belt 63 and the second transfer roller 65, the second transfer roller 65 transfers the overlapping developer images onto the sheet S from the outer circumferential surface of the intermediate transfer belt 63. Thereafter, the fixing unit 70 fixes the transferred developer images onto the sheet S. The discharge rollers 9 then convey the sheet S to discharge the sheet S to the sheet receiving surface of the discharge unit 21.

Figure 2:
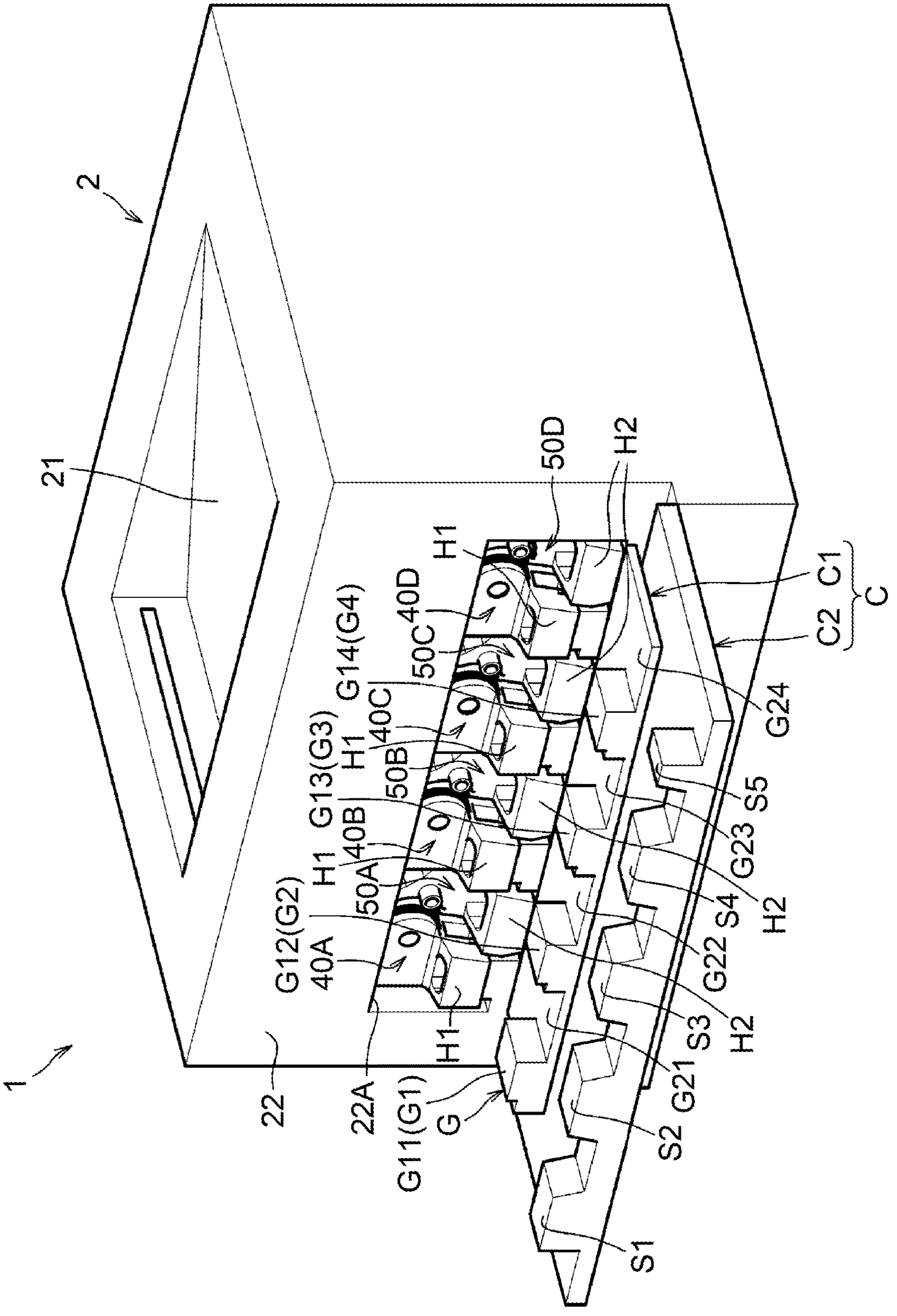
FIG. 2 is a perspective view of the color printer with a cover of a main body casing of the color printer opened.

As illustrated in FIG. 2, the main body casing 2 includes covers C. The covers C are configured to cover and uncover an opening 22A of the main body casing 2 selectively. The opening 22A allows each of the drum cartridges 40A, 40B, 40C, and 40D and the developing cartridges 50A, 50B, 50C, and 50D to be inserted into and removed from the main body casing 2.

The covers C include a first cover C1 and a second cover C2.

The first cover C1 is pivotable on its lower end. The first cover C1 is configured to selectively cover and uncover at least a portion of the opening 22A. The first cover C1 includes a guide portion G.

The guide portion G includes a plurality of, for example, four projecting portions G1, G2, G3, and G4 and a plurality of, for example, four second guide surfaces G21, G22, G23, and G24. In a state where the first cover C1 and the second cover C2 are opened, the projecting portions G1, G2, G3, and G4 protrude above the second guide surfaces G21, G22, G23, and G24.

The projecting portions G1, G2, G3, and G4 have first guide surfaces G11, G12, G13, and G14, respectively. More specifically, for example, the first guide surfaces G11, G12, G13, and G14 may be upper surfaces of the respective projecting portions G1, G2, G3, and G4.

The first guide surfaces G11, G12, G13, and G14 may guide movement of the respective drum cartridges 40A, 40B, 40C, and 40D in a state where both of the first cover C1 and the second cover C2 are opened. The first guide surfaces G11, G12, G13, and G14 may support fourth drum outer surfaces 440 of the respective drum cartridges 40A, 40B, 40C, and 40D during insertion or removal of the respective drum cartridges 40A, 40B, 40C, and 40D to or from the main body casing 2. The first guide surfaces G11, G12, G13, and G14 are positioned higher than the second guide surfaces G21, G22, G23, and G24.

The second guide surfaces G21, G22, G23, and G24 may guide movement of the respective developing cartridges 50A, 50B, 50C, and 50D in a state where both of the first cover C1 and the second cover C2 are opened. The second guide surfaces G21, G22, G23, and G24 may support third developing outer surfaces 540 of the respective developing cartridges 50A, 50B, 50C, and 50D during insertion or removal of the respective developing cartridges 50A, 50B, 50C, and to or from the main body casing 2.

The second cover C2 is pivotable on its lower end. The second cover C2 is configured to cover the opening 22A and the first cover C1. In one example, the second cover C2 may be configured to pivot in conjunction with pivot of the first cover C1. In another example, the first cover C1 and the second cover C2 may be configured to pivot respectively.

The second cover C2 includes a first stopper S1, a second stopper S2, a third stopper S3, a fourth stopper S4, and a fifth stopper S5. Each of the stoppers S1, S2, S3, S4, and S5 is configured to cause at least one of the drum cartridges 40A, 40B, 40C, and 40D and the developing cartridges 50B, 50C, and 50D to stop moving in a direction from the inside of the main body casing 2 toward the outside of the main body casing 2 with respect to the first direction.

More specifically, for example, the first stopper S1 is configured to restrict the movement of the first drum cartridge 40A toward the outside of the main body casing 2 in the first direction. The second stopper S2 is configured to restrict the movement of the first developing cartridge 50A and the second drum cartridge 40B toward the outside of the main body casing 2 in the first direction.

The third stopper S3 is configured to restrict the movement of the second developing cartridge 50B and the third drum cartridge 40C toward the outside of the main body casing 2 in the first direction. The fourth stopper S4 is configured to restrict the movement of the third developing cartridge 50C and the fourth drum cartridge 40D toward the outside of the main body casing 2 in the first direction. The fifth stopper S5 is configured to restrict the movement of fourth developing cartridge 50D toward the outside of the main body casing 2 in the first direction.

The stoppers S1, S2, S3, S4, and S5 are farther from the opening 22A than the guide portion G is from the opening 22A in a state where the first cover C1 and the second cover C2 are opened. A detailed description will be provided later on configurations of the stoppers S1, S2, S3, S4, S5.

Figure 3:
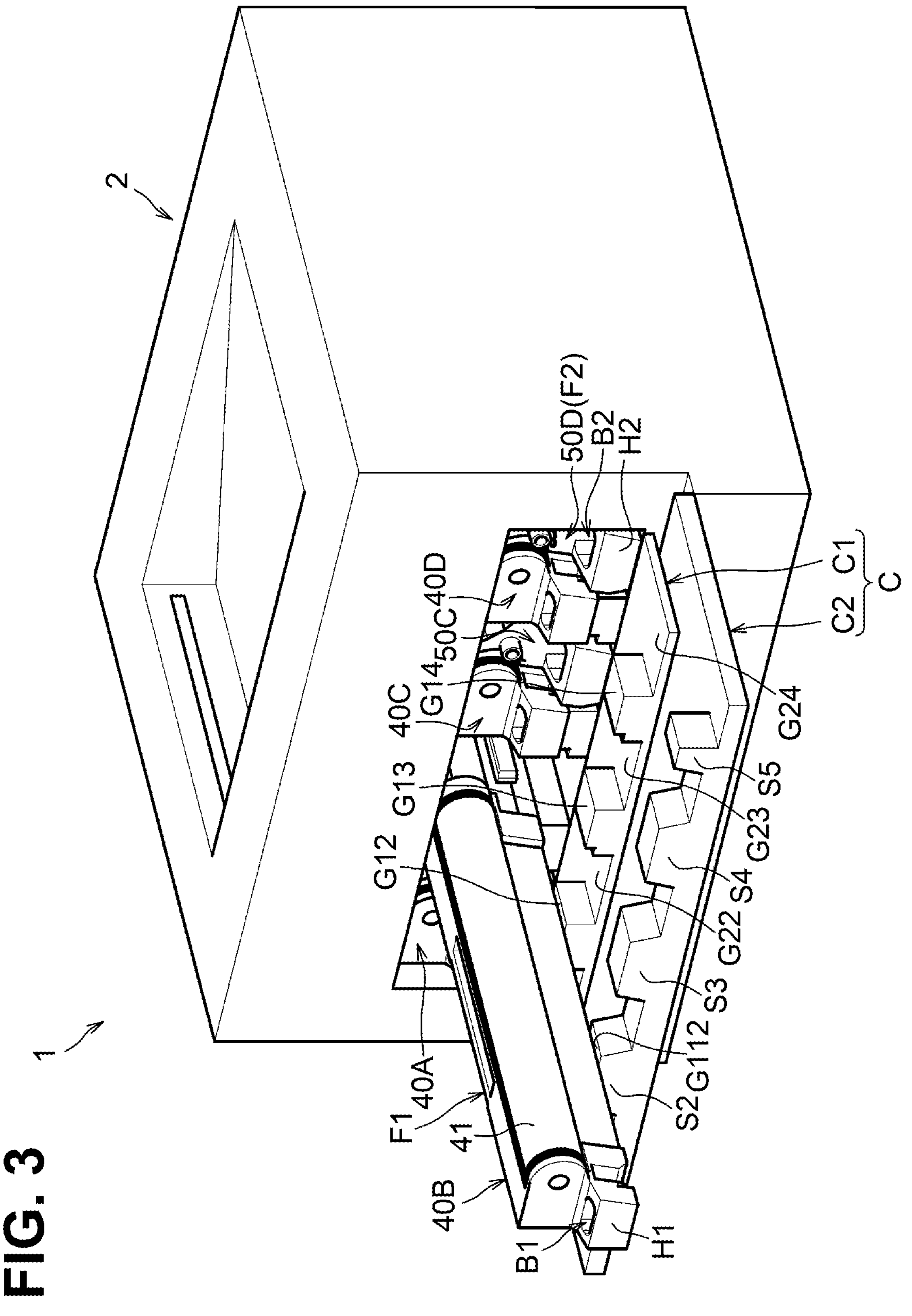
FIG. 3 is a perspective view of the color printer in which one of drum cartridges is pulled from the main body casing.
Figure 4:
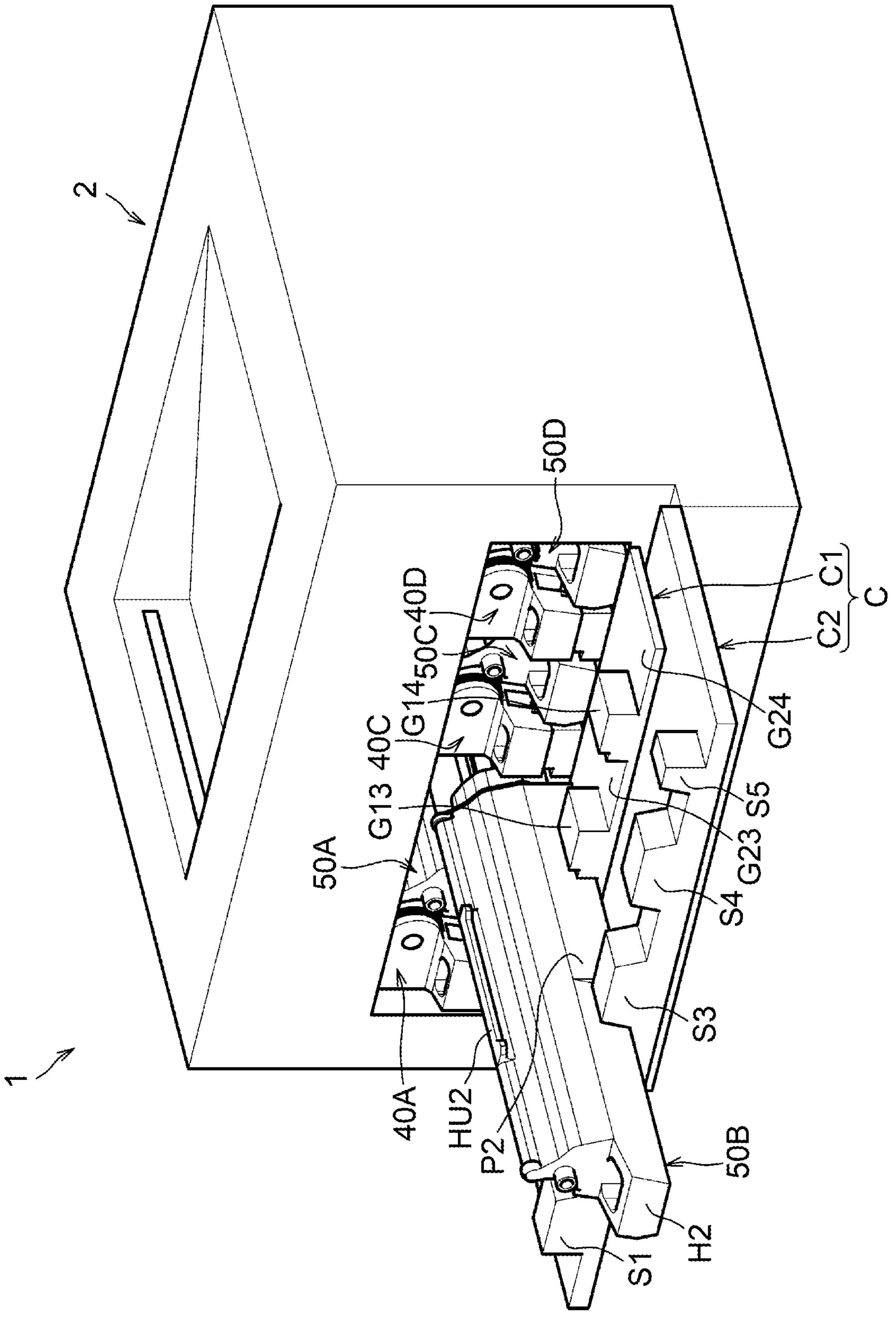
FIG. 4 is a perspective view of the color printer in which one of developing cartridges is pulled from the main body casing.

As illustrated in FIGS. 3 and 4, the drum cartridges 40A, 40B, 40C, and 40D and the developing cartridges 50A, 50B, 50C, and 50D are individually insertable into and removable from the main body casing 2 in the first direction. All of the drum cartridges 40A, 40B, 40C, and 40D may have the same configuration. All of the developing cartridge 50A, 50B, 50C, and 50D may have the same configuration. Hereinafter, a description will be thus provided on configurations of the second drum cartridge 40B and the second developing cartridge 50B representatively.

Figure 5A:
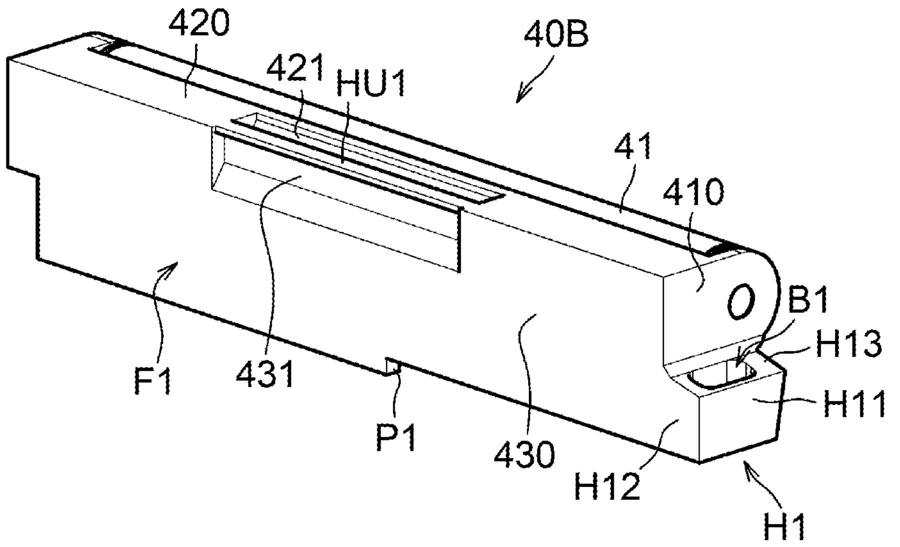
FIGS. 5A and 5B each are a perspective view of a drum cartridge.
Figure 5B:
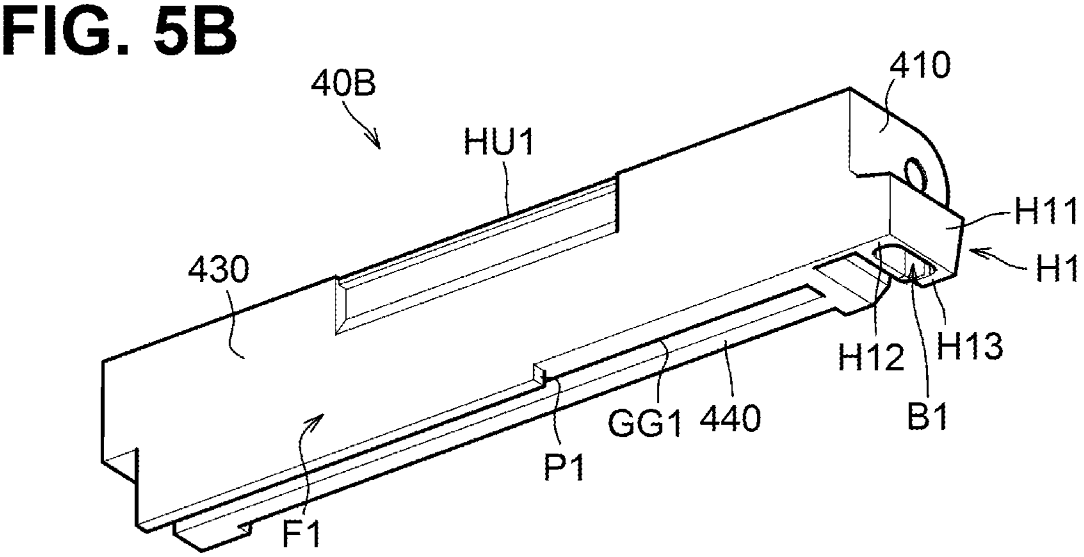

As illustrated in FIGS. 5A and 5B, the second drum cartridge 40B includes a first drum outer surface 410, a first handle H1, a second drum outer surface 420, a third drum outer surface 430, a drum handle HU1, a fourth drum outer surface 440, a first protrusion P1, and a first guide groove GG1. The first drum outer surface 410 is positioned at one end of the second drum cartridge 40B in the first direction. The first handle H1 is positioned at the first drum outer surface 410.

The first handle H1 is positioned at one end of the drum frame F1 in the first direction. The first handle H1 is positioned at a lower portion of the first drum outer surface 410. In a state where the second drum cartridge 40B is attached to the main body casing 2, the first handle H1 may be exposed to the outside of the main body casing 2 (refer to FIG. 2). In a state where the second drum cartridge 40B is attached to the main body casing 2, the first handle H1 is positioned below the photosensitive drum 41 (refer to FIG. 2).

The first handle H1 includes a first portion H11, a second portion H12, and a third portion H13. The first portion H11 is positioned away from the first drum outer surface 410 in the first direction. The second portion H12 connects between one end of the first portion H11 in the second direction and the first drum outer surface 410.

The third portion H13 is positioned away from the second portion H12 in the second direction. The third portion H13 connects between the other end of the first portion H11 in the second direction and the first drum outer surface 410 to reinforce the first handle H1.

The first drum outer surface 410, the second portion H12, the first portion H11, and the third portion H13 define a first hollow B1. That is, the first handle H1 has the first hollow B1. The first hollow B1 may be, for example, a through hole penetrating the first handle H1 from top to bottom. The first hollow B1 allows a finger of a user to be hooked in a case where the second drum cartridge 40B is removed from the main body casing 2.

The second drum outer surface 420 is positioned at an upper end of the second drum cartridge 40B.

The third drum outer surface 430 is positioned at one end of the second drum cartridge 40B in the second direction. The photosensitive drum 41 is positioned at the other end of the second drum cartridge 40B in the second direction. The third drum outer surface 430 has a recess 431 that is recessed toward the photosensitive drum 41.

The drum handle HU1 has two recesses such as a recess 421 and the recess 431. The drum handle HU1 is positioned between one end and the other end of the drum frame F1 in the first direction. In a state where the second drum cartridge 40B is attached to the main body casing 2, the drum handle HU1 is positioned above the first handle H1. The recess 421 is positioned at the second drum outer surface 420. The recess 421 is recessed downward relative to the second drum outer surface 420. The recess 431 is positioned at the third drum outer surface 430. The recess 431 is recessed toward the photosensitive drum 41.

The fourth drum outer surface 440 is contactable to the first guide surface G12. As illustrated in FIG. 5B, the first protrusion P1 and the first guide groove GG1 are positioned at the fourth drum outer surface 440.

The first protrusion P1 protrudes downward from the fourth drum outer surface 440. The first protrusion P1 is positioned away from the first handle H1 in the first direction. The first protrusion P1 is positioned at one end of the fourth drum outer surface 440 in the second direction. More specifically, for example, the fourth drum outer surface 440 has one end connecting to the third drum outer surface 430. The first protrusion P1 is positioned at the one end of the fourth drum outer surface 440.

The first guide groove GG1 is recessed upward from the fourth drum outer surface 440. The first guide groove GG1 is positioned at a middle portion of the fourth drum outer surface 440 in the second direction. The first guide groove GG1 extends in the first direction. The first guide groove GG1 has one end and the other end in the first direction. The one end of the first guide groove GG1 is closer to the first handle H1 than the other end of the first guide groove GG1 is to the first handle H1 in the first direction. The other end of the first guide groove GG1 in the first direction may be an open end opened in the first direction.

Figure 6A:
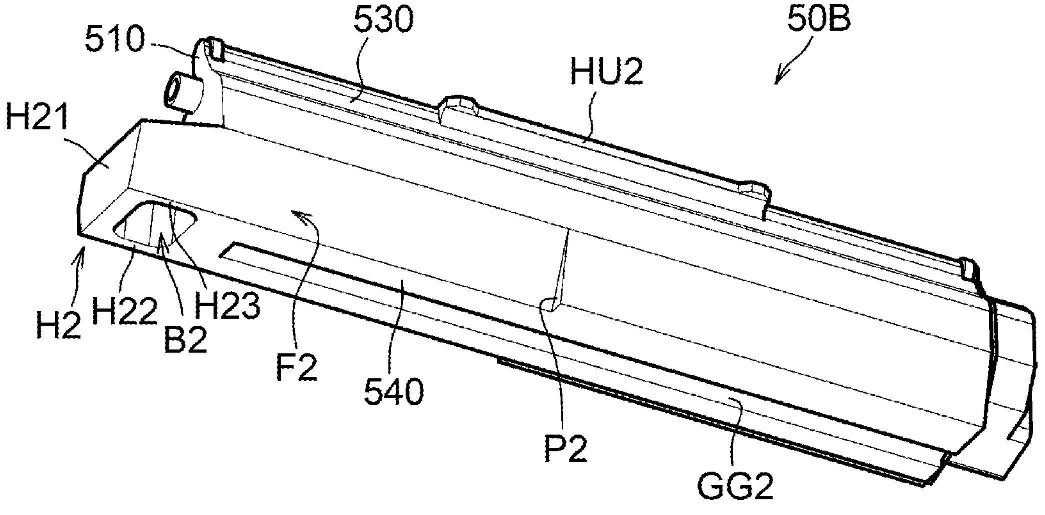
FIGS. 6A and 6B each are a perspective view of a developing cartridge.
Figure 6B:
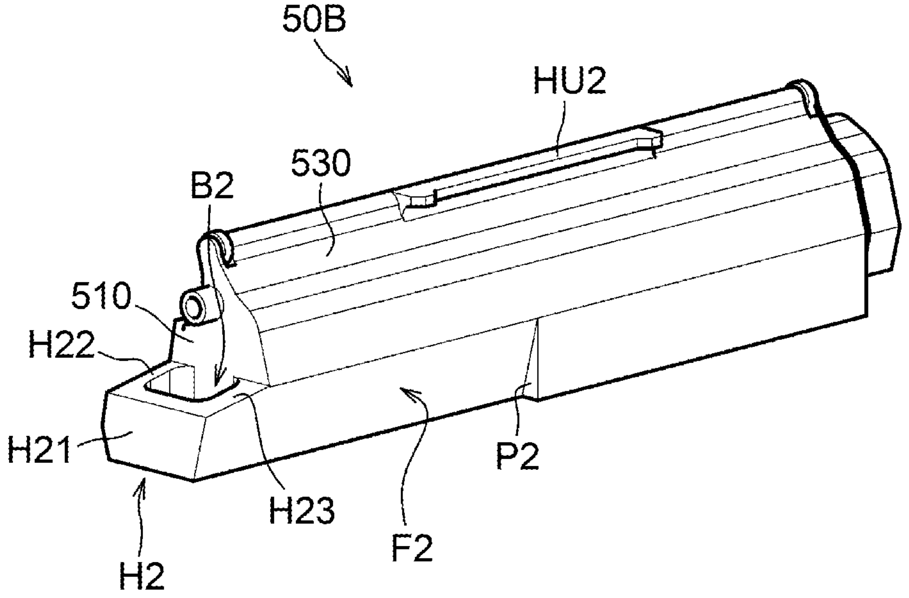

As illustrated in FIGS. 6A and 6B, the second developing cartridge 50B includes a first developing outer surface 510, a second handle H2, a second developing outer surface 530, a developing handle HU2, a third developing outer surface 540, a second protrusion P2, and a second guide groove GG2. The first developing outer surface 510 is positioned at one end of the second developing cartridge 50B in the first direction. The second handle H2 is positioned at the first developing outer surface 510.

The second handle H2 is positioned at one end of the developing frame F2 in the first direction. In a state where the second developing cartridge 50B is attached to the main body casing 2, the second handle H2 may be exposed to the outside of the main body casing 2 (refer to FIG. 2). In a state where the second developing cartridge 50B is attached to the main body casing 2, the second handle H2 is positioned below the developing roller 51. In a state where the drum cartridges 40A, 40B, 40C, and 40D and the developing cartridges 50A, 50B, 50C, and 50D are attached to the main body casing 2, at least a portion of the second handle H2 of each of the developing cartridges 50A, 50B, 50C, and 50D is positioned below the first handles H1 of the drum cartridges 40B, 40C, and 40D (refer to FIG. 2).

The second handle H2 is positioned at a lower portion the first developing outer surface 510. The second handle H2 includes a fourth portion H21, a fifth portion H22, and a sixth portion H23. The fourth portion H21 is positioned away from the first developing outer surface 510 in the first direction. The fifth portion H22 connects between one end of the fourth portion H21 in the second direction and the first developing outer surface 510.

The sixth portion H23 is positioned away from the fifth portion H22 in the second direction. The sixth portion H23 connects between the other end of the fourth portion H21 in the second direction and the first developing outer surface 510 to reinforce the second handle H2.

The first developing outer surface 510, the fifth portion H22, the fourth portion H21, and the sixth portion H23 define a second hollow B2. That is, the second handle H2 has the second hollow B2. The second hollow B2 may be, for example, a through hole penetrating the second handle H2 from top to bottom. The second hollow B2 allows a finger of a user to be hooked in a case where the second developing cartridge 50B is removed from the main body casing 2.

The second developing outer surface 530 is positioned at one end of the second developing cartridge 50B in the second direction. The developing handle HU2 is positioned at an upper end of the second developing outer surface 530. The developing handle HU2 protrudes from the second developing outer surface 530 in the second direction.

The second developing outer surface 530 extends in a direction intersecting the second direction. The second protrusion P2 is positioned at a lower portion of the second developing outer surface 530. The second protrusion P2 protrudes from the second developing outer surface 530 in the second direction. The second protrusion P2 is positioned away from the second handle H2 in the first direction.

The third developing outer surface 540 is contactable to the second guide surface G22. As illustrated in FIG. 6A, the second guide groove GG2 is positioned at the third developing outer surface 540.

The second guide groove GG2 is recessed upward from the third developing outer surface 540. The second guide groove GG2 is positioned at a middle portion of the third developing outer surface 540 in the second direction. The second guide groove GG2 extends in the first direction. The second guide groove GG2 has one end and the other end in the first direction. The one end of the second guide groove GG2 is closer to the second handle H2 than the other end of the second guide groove GG2 is to the second handle H2 in the first direction. The other end of the second guide groove GG2 in the first direction may be an open end opened in the first direction.

Figure 7:
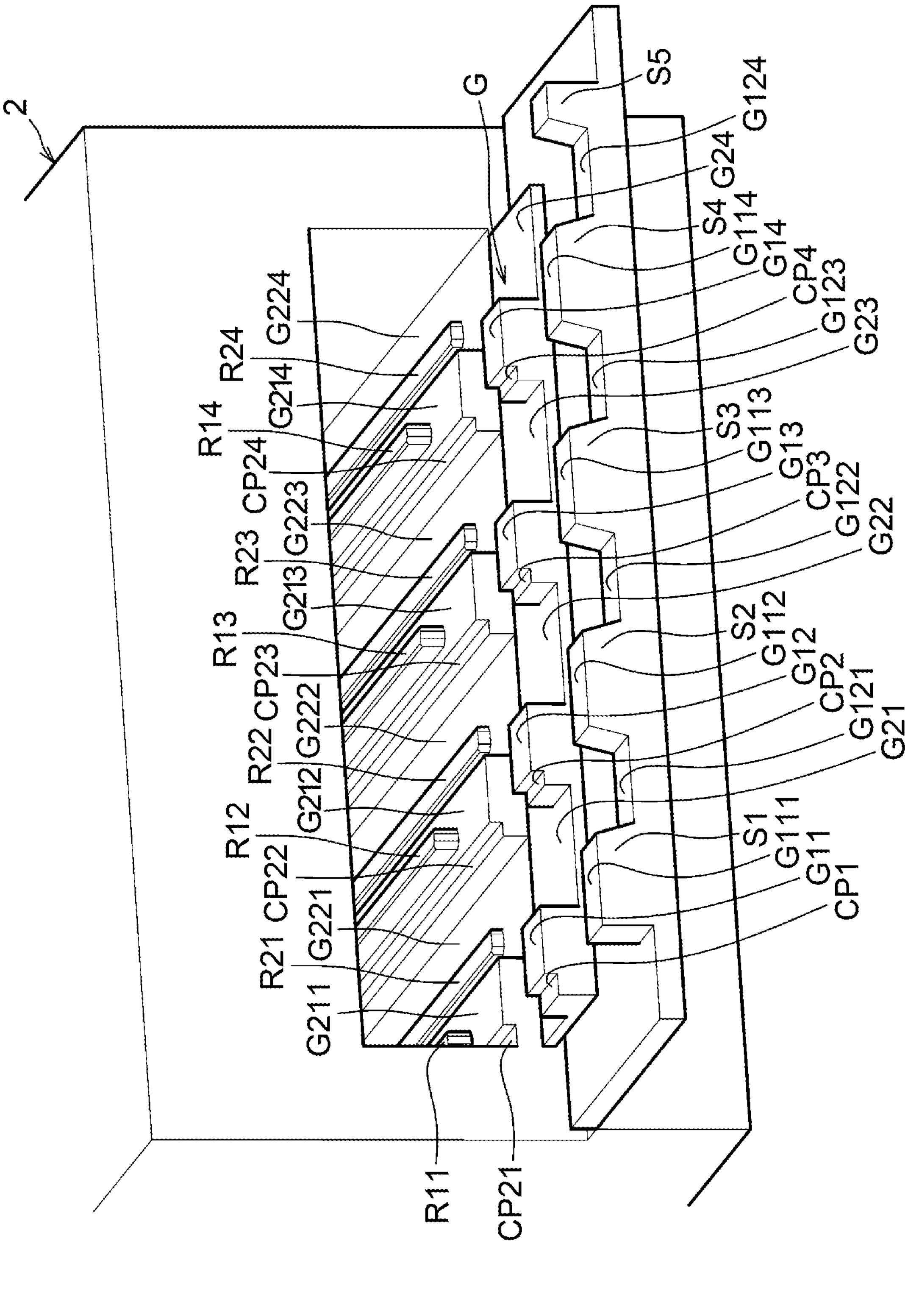
FIG. 7 is a perspective view illustrating a configuration of the main body casing.

As illustrated in FIG. 7, the first stopper S1, the second stopper S2, the third stopper S3, and the fourth stopper S4 have first guide surfaces G111, G112, G113, and G114, respectively. The first guide surfaces G111, G112, G113, and G114 may support the fourth drum outer surfaces 440 of the respective drum cartridges 40A, 40B, 40C, and 40D during insertion or removal of each of the drum cartridges 40A, 40B, 40C, and 40D to or from the main body casing 2. The first guide surfaces G111, G112, G113, and G114 are level with the first guide surfaces G11, G12, G13, and G14 of the guide portion G in the up-down direction.

The second cover C2 has second guide surfaces G121, G122, G123, and G124, one of which is positioned between corresponding adjacent two of the stoppers S1, S2, S3, S4, and S5. The second guide surfaces G121, G122, G123, and G124 may support the third developing outer surfaces 540 of the respective developing cartridges 50A, 50B, 50C, and 50D during insertion or removal of each of the developing cartridges 50A, 50B, 50C, and 50D to or from the main body casing 2. The second guide surfaces G121, G122, G123, and G124 are level with the second guide surfaces G21, G22, G23, and G24 of the guide portion G in the up-down direction. The stoppers S1, S2, S3, S4, and S5 protrude upward relative to the second guide surfaces G121, G122, G123, and G124.

The main body casing 2 has first guide surfaces G211, G212, G213, and G214 and second guide surfaces G221, G222, G223, and G224, first guide rails R11, R12, R13, and R14, and second guide rails R21, R22, R23, and R24.

The first guide surfaces G211, G212, G213, and G214 may support the fourth drum outer surfaces 440 of the respective drum cartridges 40A, 40B, 40C, and 40D during insertion or removal of each of the drum cartridges 40A, 40B, 40C, and 40D to or from the main body casing 2. The first guide surfaces G211, G212, G213, and G214 are level with the first guide surfaces G11, G12, G13, and G14 of the guide portion Gin the up-down direction.

The second guide surfaces G221, G222, G223, and G224 may support the third developing outer surfaces 540 of the respective developing cartridges 50A, 50B, 50C, and 50D during insertion or removal of each of the developing cartridges 50A, 50B, 50C, and 50D to or from the main body casing 2. The second guide surfaces G221, G222, G223, and G224 are level with the second guide surfaces G21, G22, G23, and G24 of the guide portion G in the up-down direction.

The first guide rails R11, R12, R13, and R14 may guide movement of the respective drum cartridges 40A, 40B, 40C, and 40D in the first direction. The first guide rails R11, R12, R13, and R14 each extend in the first direction. The first guide rails R11, R12, R13, and R14 are configured to be engaged with the first guide grooves GG1 (refer to FIG. 5) of the respective drum cartridges 40A, 40B, 40C, and 40D.

The second guide rails R21, R22, R23, and R24 may guide movement of the respective developing cartridges 50A, 50B, 50C, and 50D in the first direction. The second guide rails R21, R22, R23, and R24 each extend in the first direction. The second rails R21, R22, R23, and R24 are configured to be engaged with the second guide grooves GG2 (refer to FIG. 6) of the respective developing cartridges 50A, 50B, 50C, and 50D.

Figure 8:
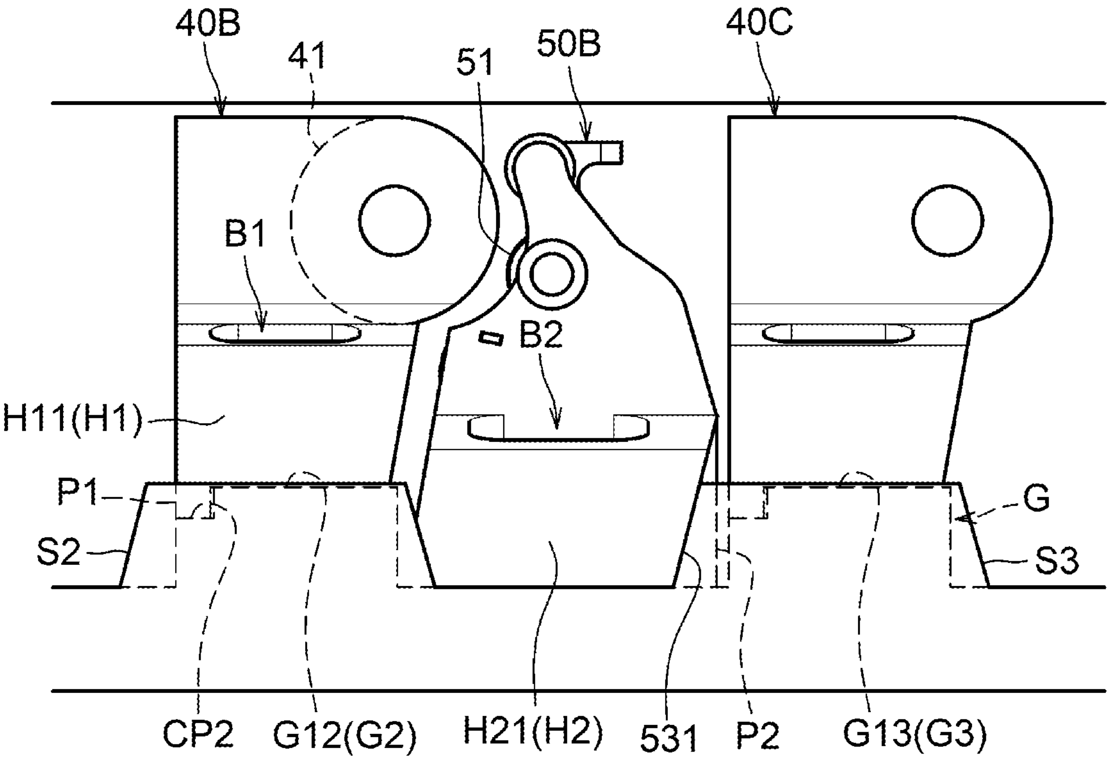
FIG. 8 illustrates a relationship between cartridges and corresponding stoppers.

The guide portion G has a plurality of, for example, four recessed portions CP1, CP2, CP3, and CP4. The recessed portions CP1, CP2, CP3, and CP4 are recessed downward relative to the respective first guide surfaces G11, G12, G13, and G14. As illustrated in FIG. 8, in a state where the second drum cartridge 40B is supported by the first guide surface G12, the first protrusion P1 of the second drum cartridge 40B is engaged with the recessed portion CP2. Such a configuration may thus allow the second drum cartridge 40B to move in the first direction without being interfered by the guide portion G in the first direction.

Figure 9:
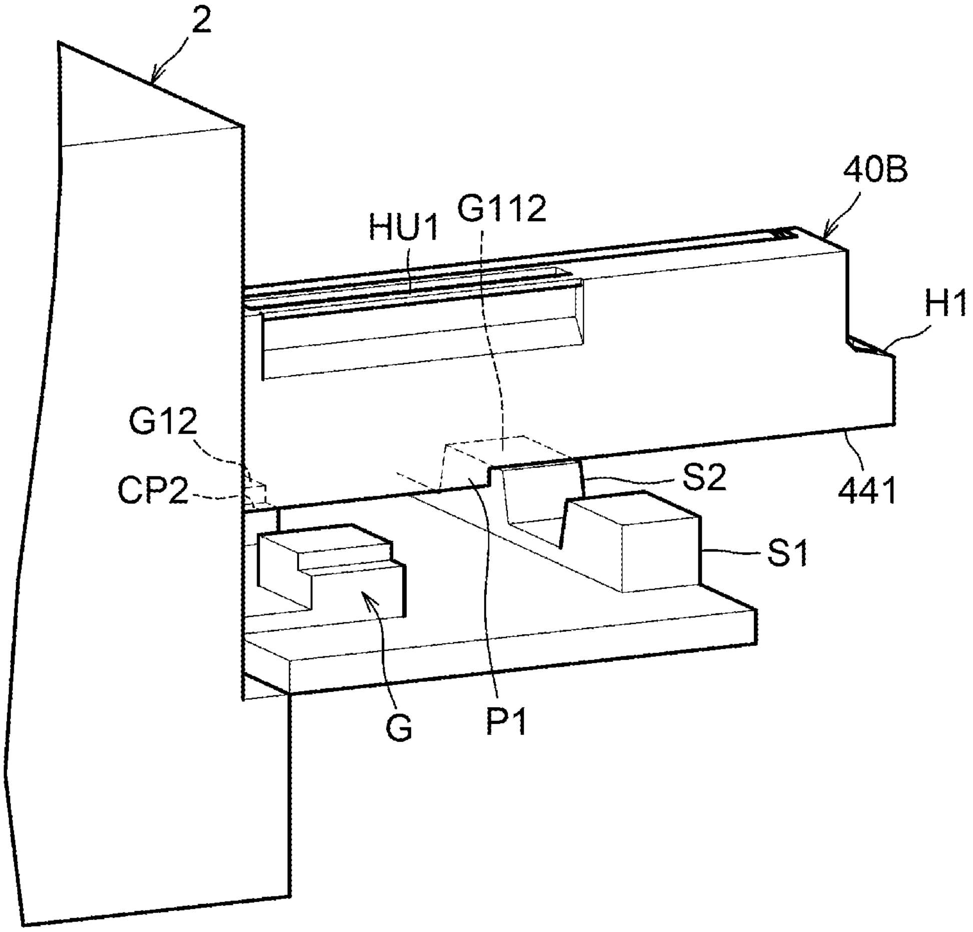
FIG. 9 is a perspective view illustrating a state in which one of the drum cartridges contacts a corresponding stopper.

The recessed portion CP2 overlaps the second stopper S2 when viewed in the first direction. With such a configuration, as illustrated in FIG. 9, during removal of the second drum cartridge 40B from the main body casing 2, the first protrusion P1 contacts the second stopper S2 after the first protrusion P1 passes the recessed portion CP2 of the guide portion G. Thus, the second drum cartridge 40B may be caused to stop moving in the direction from the inside of the main body casing 2 toward the outside of the main body casing 2 with respect to the first direction.

As illustrated in FIG. 7, the other recessed portions CP1, CP3, and CP4 are also configured in a similar manner to the recessed portion CP2 such that relationships between the recessed portions CP1, CP3, and CP4 and the respective corresponding drum cartridges 40A, 40C, and 40D may be the same as the relationship between the recessed portion CP2 and the corresponding drum cartridge 40B. The main body casing 2 has recessed portions CP21, CP22, CP23, and CP24 similar to the recessed portions CP1, CP2, CP3, and CP4 of the guide portion G. Relationships between the recessed portions CP21, CP22, CP23, and CP24 of the main body casing 2 and the respective corresponding drum cartridges 40A, 40B, 40C, and 40D may be the same as the relationships between the recessed portions CP1, CP2, CP3, and CP4 and the respective corresponding drum cartridges 40A, 40B, 40C, and 40D. Relationships between the other recessed portions CP1, CP3, and CP4 and the respective corresponding stoppers S1, S3, and S4 may be the same as the relationship between the recessed portion CP2 and the corresponding stopper S2.

As illustrated in FIG. 8, the second developing cartridge 50B has a size allowed to pass between the projecting portions G2 and G3 of the guide portion G. One end portion of the second developing cartridge 50B in the first direction, more specifically, for example, the second handle H2, has a size allowed to pass between the second stopper S2 and the third stopper S3. In a state where the second developing cartridge 50B is attached to the main body casing 2, the second protrusion P2 of the second developing cartridge 50B overlaps the third stopper S3 when viewed in the first direction.

Figure 10:
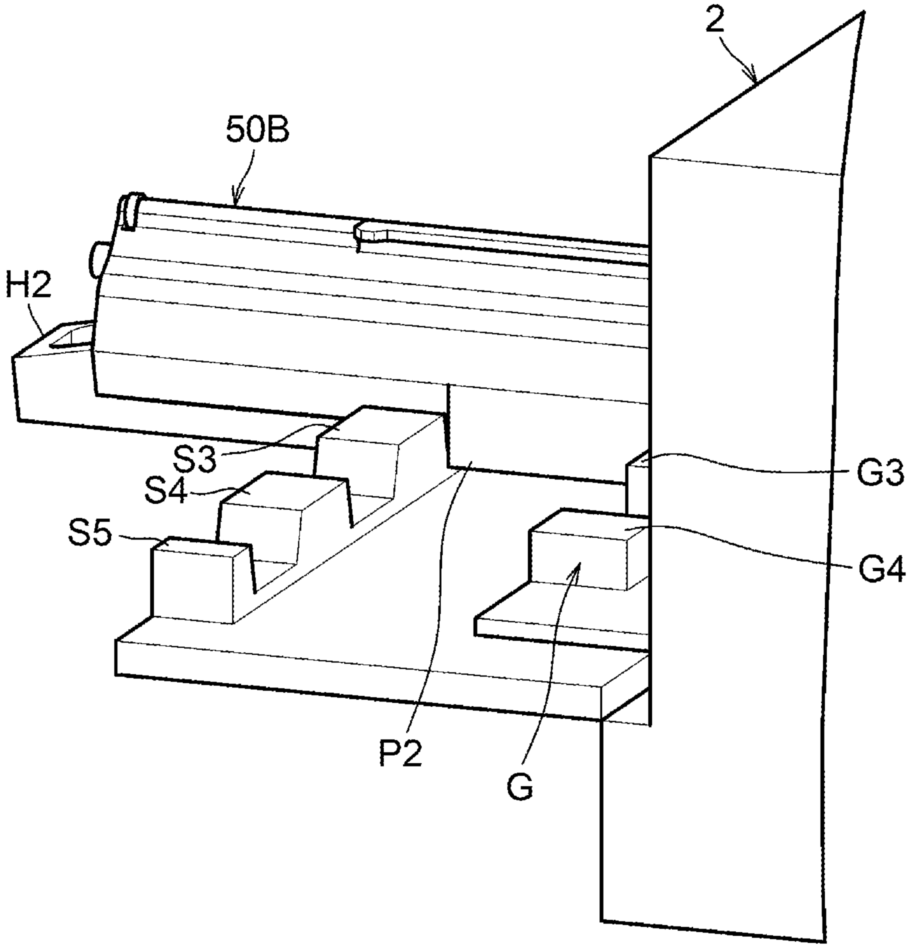
FIG. 10 is a perspective view illustrating a state in which one of the developing cartridges contacts a corresponding stopper.

With such a configuration, as illustrated in FIG. 10, during removal of the second developing cartridge 50B from the main body casing 2, first, the one end portion of the second developing cartridge 50B passes between the projecting portions G2 and G3 of the guide portion G. After the second handle H2 of the second developing cartridge 50B passes between the second stopper S2 and the third stopper S3, the second protrusion P2 of the second developing cartridge 50B contacts the third stopper S3. Thus, the second developing cartridge 50B may be caused to stop moving in the direction from the inside of the main body casing 2 toward the outside of the main body casing 2 with respect to the first direction.

The second protrusions P2 of the other developing cartridges 50A, 50C, and 50D each have the same or similar configuration to the second protrusion P2 of the second developing cartridge 50B, and the other stoppers S3, S4, and S5 each have the same or similar configuration to the third stopper S3.

Hereinafter, a description will be provided on insertion and removal procedures for the second drum cartridge 40B and the second developing cartridge 50B, respectively. Insertion and removal procedures for the other drum cartridges and the developing cartridges may be the same as the insertion and removal procedures for the second drum cartridge 40B and the second developing cartridge 50B, and therefore, a description will be omitted for the insertion and removal procedures for those other cartridges.

As illustrated in FIG. 2, in response to the first cover C1 and the second cover C2 being opened, the handles H1 and H2 of the respective cartridges are exposed via the opening 22A of the main body casing 2. For removing the second drum cartridge 40B from the main body casing 2, a user holds the first handle H1 of the second drum cartridge 40B. More specifically, for example, the user hooks a finger into the first hollow B1 of the second drum cartridge 40B.

The user then pulls the second drum cartridge 40B in the first direction. In response to the user pulling the second drum cartridge 40B, as illustrated in FIG. 3, the second drum cartridge 40B is moved in the first direction with being guided by the first guide surfaces G212, G12, and G112 (refer to FIG. 7).

As illustrated in FIG. 9, in response to the first protrusion P1 of the second drum cartridge contacting the second stopper S2, the second drum cartridge 40B is caused to stop moving in the first direction. Such a configuration may thus reduce or prevent the second drum cartridge 40B from falling from the main body casing 2. Thereafter, the user holds the drum handle HU1 and lifts up the second drum cartridge 40B. Consequently, the user may remove the second drum cartridge easily from the main body casing 2.

For removing the second developing cartridge 50B from the main body casing 2, as illustrated in FIG. 2, the user holds the second handle H2 of the second developing cartridge 50B. More specifically, for example, the user hooks a finger into the second hollow B2 of the second developing cartridge 50B.

The user then pulls the second developing cartridge 50B in the first direction. In response to the user pulling the second developing cartridge 50B, as illustrated in FIG. 4, the second developing cartridge 50B is moved in the first direction with being guided by the second guide surfaces G222, G22, and G122 (refer to FIG. 7).

As illustrated in FIG. 10, in response to the second protrusion P2 of the second developing cartridge 50B contacting the third stopper S3, the second developing cartridge 50B is caused to stop moving in the first direction. Such a configuration may thus reduce or prevent the second developing cartridge 50B from falling from the main body casing 2. Thereafter, the user holds the developing handle HU2 and lifts up the second developing cartridge 50B. Consequently, the user may remove the second developing cartridge 50B easily from the main body casing 2.

For inserting the respective cartridges 40B and 50B, the user may perform the procedures for removing the respective cartridges 40B and 50B in a reverse order.

According to the illustrative embodiment, the following effects may be achieved.

The drum cartridges 40A, 40B, 40C, and 40D each have such a configuration that may allow a finger of a user to be hooked between the first portion H11 of the first handle H1 and the first drum outer surface 410, thereby enabling the user to pull the respective drum cartridges 40A, 40B, 40C, and 40D easily. The developing cartridges 50A, 50B, 50C, and 50D each have such a configuration that may allow a finger of a user to be hooked between the fourth portion H21 of the second handle H2 and the first developing outer surface 510, thereby enabling the user to pull the respective developing cartridges 50A, 50B, 50C, and 50D easily.

The first portion H11 is connected to the first drum outer surface 410 by the second portion H12 and the third portion H13. Such a configuration may reduce or prevent the first portion H11 from bending in a case where a user hooks a finger on the first portion H11, thereby reducing deformation of the first portion H11. The fourth portion H21 is connected to the first developing outer surface 510 by the fifth portion H22 and the sixth portion H23. Such a configuration may reduce or prevent the fourth portion H21 from bending in a case where a user hooks a finger on the fourth portion H21, thereby reducing deformation of the fourth portion H21.

The first handle H1 is positioned at the lower portion of the first drum outer surface 410, thereby enabling a user to easily hook a finger into the first hollow B1 defined between the first portion H11 and the first drum outer surface 410 from above. The second handle H2 is positioned at the lower portion of the first developing outer surface 510, thereby enabling a user to easily hook a finger into the second hollow B2 defined between the fourth portion H21 and the first developing outer surface 510 from above.

The first hollow B1 and the second hollow B2 may each penetrate the first handle H1 and the second handle H2, respectively. Such a configuration may thus enable a user to hook a finger or fingers into the first hollow B1 or into the second hollow B2 from above, below, or both.

A drum cartridge (e.g., the first drum cartridge 40A) and a developing cartridge (e.g., the first developing cartridge 50A) have the handles H1 and H2, respectively. Such a configuration may thus enable a user to easily pull the drum cartridge and the developing cartridge respectively in the first direction by holding the respective handles H1 and H2.

The second cover C2 includes the stoppers S1, S2, S3, S4, and S5. Each stopper (e.g., the first stopper S1) may thus reduce or prevent a corresponding cartridge (e.g., the first drum cartridge 40A) from falling from the main body casing 2 in a case where, for example, a user pulls the cartridge from the main body casing 2 strongly.

The first guide surfaces (e.g., the first guide surface G11) are positioned higher than the second guide surfaces (e.g., the second guide surface G21). Such a configuration may thus allow a developing roller 51 and a photosensitive drum 41 to be separated from each other during insertion and removal of a cartridge, thereby reducing contact resistance between the developing roller 51 and the photosensitive drum 41 during insertion or removal of the cartridge.

In a state where the first cover C1 and the second cover C2 are opened, the stoppers S1, S2, S3, S4, and S5 are farther from the opening 22A than the guide portion G from the opening 22A. Such a configuration may thus enable a most portion of each of the cartridges to be pulled out of the main body casing 2 via the opening 22A.

The second stopper S2 is configured to contact both of the first developing cartridge 50A and the second drum cartridge 40B. As compared with a configuration including a stopper for the first developing cartridge 50A and another stopper for the second drum cartridge 40B, the configuration according to the illustrative embodiment may have a simple configuration. Likewise, the third stopper S3 and the fourth stopper S4 are each configured to cause corresponding two cartridges to stop moving, thereby enabling the configuration according to the illustrative embodiment to be further simplified.

Each cartridge has one of the drum handle HU1 and the developing handle HU2. Such a configuration may thus enable a user to remove a cartridge from the main body casing 2 by lifting up the cartridge with holding the drum handle HU1 or the developing handle HU2 after pulling, in the first direction, the cartridge using the handle H1 or H2.

The drum handle HU1 includes the recess 421 recessed relative to the second drum outer surface 420. Thus, the drum handle HU1 might not protrude from the second drum outer surface 420.

Both of a drum cartridge (e.g., the first drum cartridge 40A) and a developing cartridge (e.g., the first developing cartridge 50A) have respective handles (e.g., the drum handle HU1 and the developing handle HU2), thereby enabling a user to easily remove the respective cartridges upward.

While the disclosure has been described in detail with reference to the specific embodiment thereof, this is merely an example, and various changes, arrangements and modifications may be applied therein without departing from the spirit and scope of the disclosure. A description will be provided mainly for the components or elements different from the illustrative embodiment, and a description will be omitted for the common components or elements by assigning the same reference numerals thereto.

Figure 11:
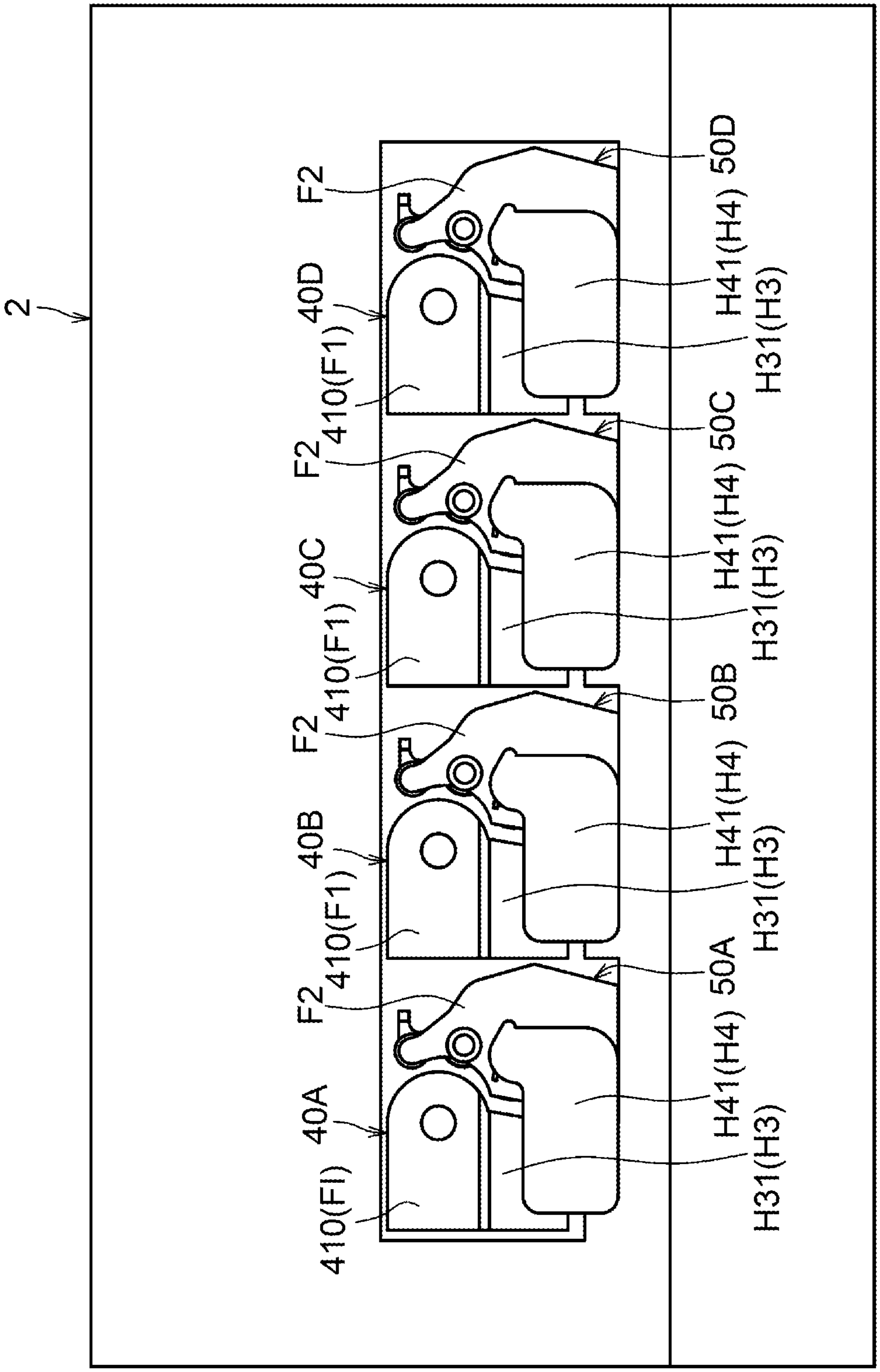
FIG. 11 illustrates a first modification of the disclosure.

In a first modification, as illustrated in FIG. 11, in a state where drum cartridges 40A, 40C, and 40D and developing cartridges 50A, 50B, 50C, and 50D are attached to a main body casing 2, a second handle H4 of each of the developing cartridges 50A, 50B, 50C, and 50D overlaps at least a portion of a corresponding one of the drum cartridges 40A, 40B, 40C, and 40D when viewed in the first direction. The overlapping cartridges correspond to the same particular color. In a state where the drum cartridges 40A, 40B, 40C, and 40D and the developing cartridges 50B, 50C, and 50D are attached to the main body casing 2, at least a portion of the second handle H4 of each of the developing cartridges 50A, 50B, 50C, and 50D is positioned farther from a drum frame F1 than a first handle H3 from the drum frame F1 in the first direction.

In a state where the drum cartridges 40A, 40B, 40C, and 40D and the developing cartridges 50A, 50B, 50C, and 50D are attached to the main body casing 2, at least a portion of the second handle H2 of each of the developing cartridges 50A, 50B, 50C, and 50D is positioned below the first handles H3 of the drum cartridges 40A, 40B, 40C, and 40D.

Figure 12:
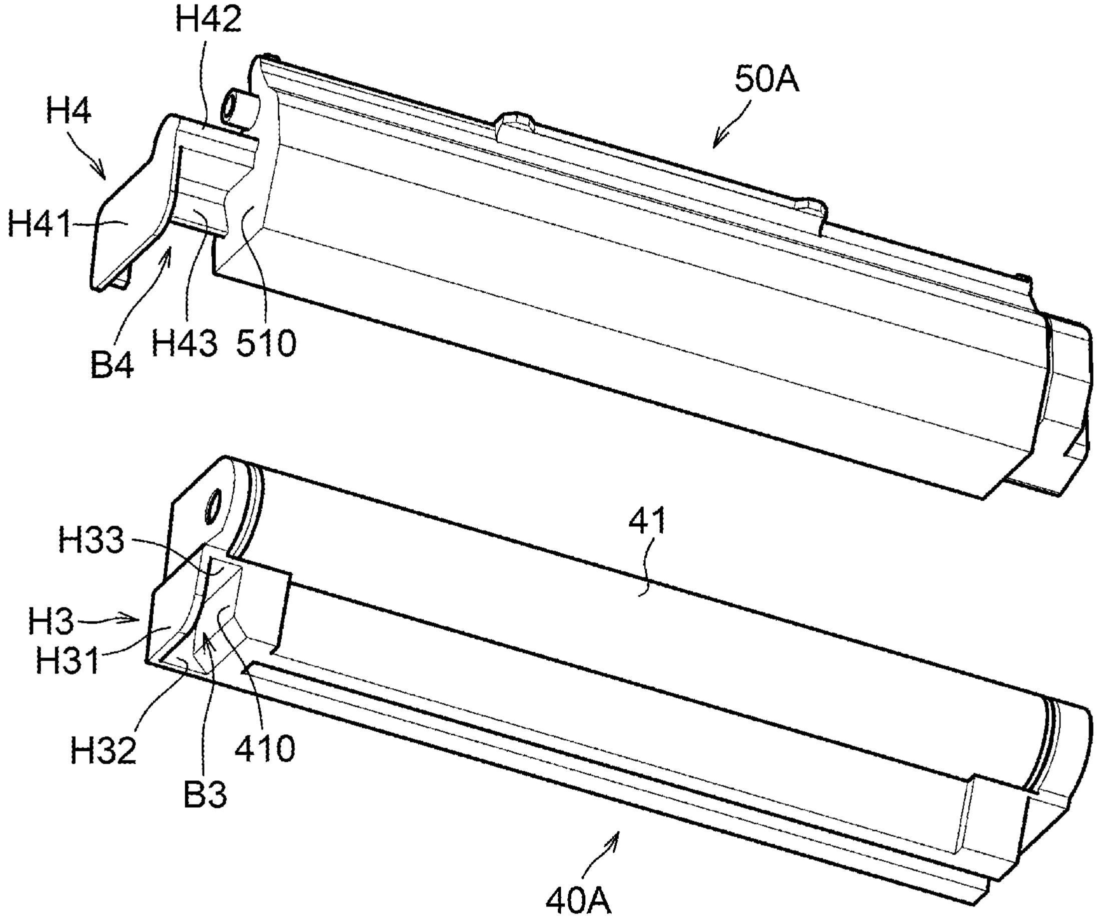
FIG. 12 is a perspective view illustrating a drum cartridge and a developing cartridge according to the first modification.

As illustrated in FIG. 12, the first handle H3 includes a first portion H31, a second portion H32, and a third portion H33. The second portion H32 and the third portion H33 connect between the first portion H31 and a first drum outer surface 410. The second portion H32 is positioned at one end of the fourth drum outer surface 410 in the second direction. A photosensitive drum 41 is positioned at the other end of the first drum outer surface 410 in the second direction.

The third portion H33 is positioned at an upper end of the first portion H31. The third portion H33 is connected to an upper end of the second portion H32. The drum cartridge 40A has a first hollow B3 between the first handle H3 and the first drum outer surface 410. That is, the first handle H3 has the first hollow B3. The first hollow B3 may be recessed upward from below and also recessed from one of the sides of the first handle H3 in the second direction.

The second handle H4 includes a fourth portion H41, a fifth portion H42, and a sixth portion H43. The fifth portion H42 and the sixth portion H43 connect between the fourth portion H41 and a first developing outer surface 510. The fifth handle H42 is positioned at an upper end of the fourth portion H41.

The sixth portion H43 is positioned at one end of the fifth portion H42 in the second direction. The fourth portion H41 extends downward below the fifth portion H42 and the sixth portion H43. The developing cartridge 50A has a second hollow B4 between the second handle H4 and the first developing outer surface 510. That is, the second handle H4 has the second hollow B4. The second hollow B4 may be recessed from one of the sides of the second handle H4 in the second direction and penetrate the second handle H4 from top to bottom.

In a state where a drum cartridge (e.g., the drum cartridge 40A) and a developing cartridge (e.g., the developing cartridge 50A) that correspond to the same particular color are attached to the main body casing 2, the first portion H31 and the fourth portion H41 overlap each other when viewed in the first direction. More specifically, for example, the fourth portion H41 partially covers the first portion H21 when viewed in the first direction. In other words, the fourth portion H41 is farther from the first drum outer surface 410 than the first portion H31 is from the first drum outer surface 410 in the first direction.

The fourth portion H41 and the first drum outer surface 410 overlap each other when viewed in the first direction. In other words, the fourth portion H41 extends in a manner to overlap the first drum outer surface 410 when viewed in the first direction. The fourth portion H41 has a lower end positioned lower than a lower end of the first portion H31.

In the first modification, the first portion H31 and the fourth portion H41 overlap each other when viewed in the first direction. Such a configuration may thus enable the fourth portion H41 to have a relatively large area, thereby enabling a user to hook a finger on the fourth portion H41 more easily as compared with a case where such a fourth portion H41 has a relatively small area.

The fourth portion H41 is farther from the first drum outer surface 410 than the first portion H31 is from the first drum outer surface 410 in the first direction. Such a configuration may thus enable a user to easily hook a finger on the fourth portion H41 of a developing cartridge (e.g., the developing cartridge 50A). Consequently, the user may easily perform insertion and removal of a developing cartridge that may be replaced with a relatively high frequency.

The fourth portion H41 extends in a manner to overlap the first drum outer surface 410 when viewed in the first direction. Such a configuration may thus enable the fourth portion H41 to have a relatively large area.

The lower end of the fourth portion H41 is positioned lower than the lower end of the first portion H31. Such a configuration may thus reduce or prevent a finger of a user from being hooked accidentally on a first portion H31 of a drum cartridge (e.g., the drum cartridge 40A) during replacement of a developing cartridge (e.g., the developing cartridge 50A).

The third portion H33 is positioned at the upper end of the first portion H31. Such a configuration may thus reduce or prevent a finger of a user from being inserted into the first hollow B3 in a case where the user hooks the finger on the fourth portion H41 from above.

In the first modification, the fourth portion H41 partially covers the first portion H31. Nevertheless, the disclosure is not limited to such an example. Such a fourth portion may cover at least a portion of a first portion. In another example, the fourth portion may cover an entirety of the first portion.

In still another example, a first portion may cover at least a portion of a fourth portion.

Figure 13:
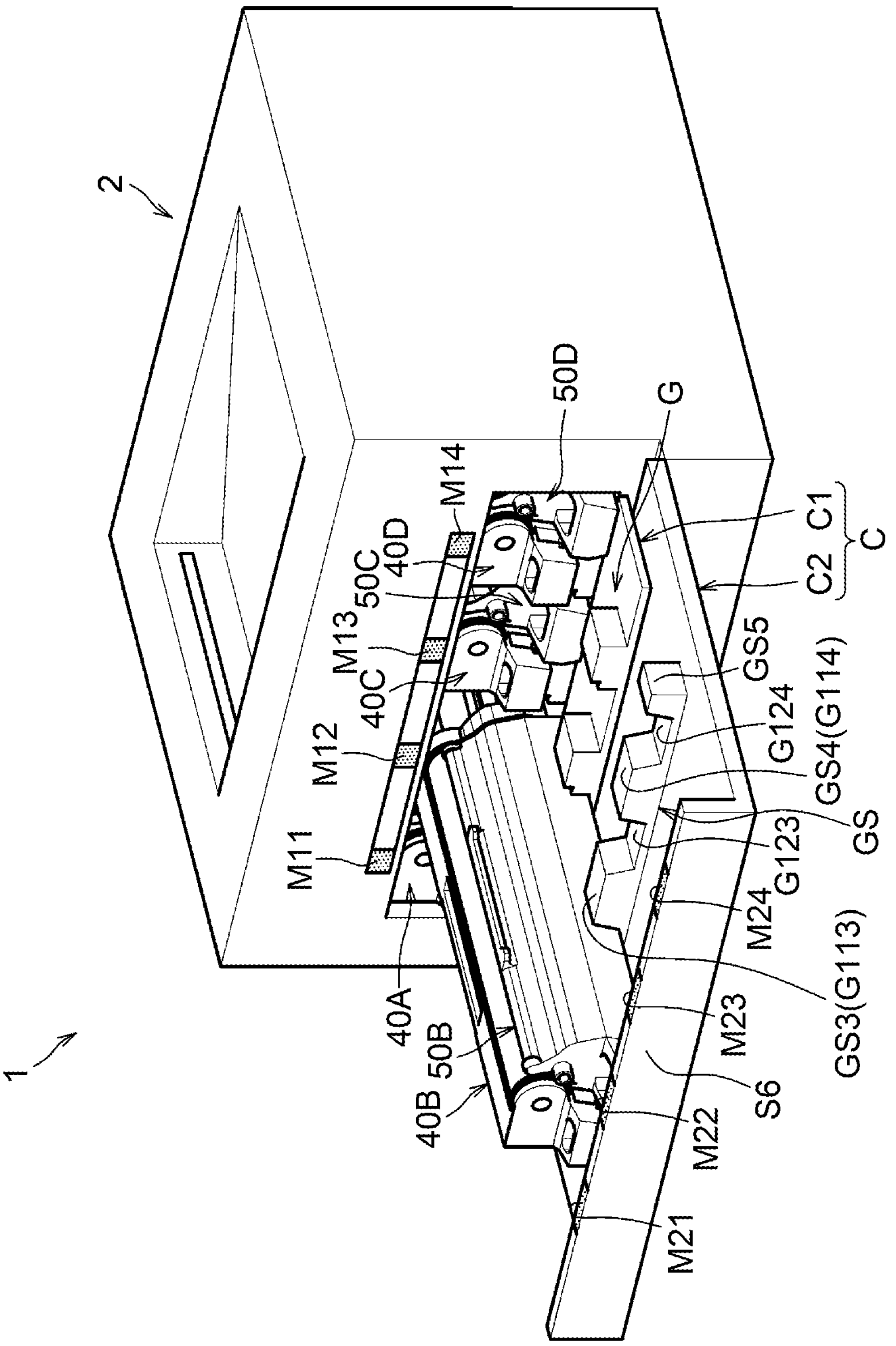
FIG. 13 illustrates a second modification of the disclosure.

The configuration of the second cover C2 is not limited to the specific example of the illustrative embodiment. As illustrated in FIG. 13, in a second modification, for example, a second cover C2 includes a stopper S6. More specifically, for example, in a state where the second cover C2 is opened, the stopper S6 extends upward from a distal end of the second cover C2. The stopper S6 extends between one end and the other end of the second cover C2 in the second direction. The stopper S6 is configured to contact all drum cartridges and all developing cartridges (FIG. 12 illustrates a drum cartridge 40B and a developing cartridge 50B only) respectively in the first direction. The stopper S6 may thus reduce or prevent all the cartridges from falling from a main body casing 2.

The second cover C2 further includes a second guide portion GS. The second guide portion GS includes a plurality of, for example, five projecting portions GS1, GS2, GS3, GS4, and GS5 (the projecting portions GS1 and GS2 are not illustrated in FIG. 13), a plurality of, for example, four first guide surfaces G111, G112, G113, and G114 (the first guide surfaces G111 and G112 are not illustrated in FIG. 13), and a plurality of, for example, four second guide surfaces G121, G122, G123, and G124 (the second guide surfaces G121 and G122 are not illustrated). The first guide surfaces G111, G112, G113, and G114 and the second guide surfaces G121, G122, G123, and G124 are the same or similar to the first guide surfaces and the second guide surfaces according to the illustrative embodiment. The projecting portions GS1, GS2, GS3, GS4, and GS5 may be identical in shape to the stoppers S1, S2, S3, S4, and S5 according to the illustrative embodiment. In a state where a first cover C1 and the second cover C2 are opened, the second guide portion GS is positioned between a guide portion G of the first cover C1 and the stopper S6 in the first direction.

In the second modification, drum cartridges 40A, 40B, 40C, and 40D might not include a first protrusion P1 that each of the drum cartridges 40A, 40B, 40C, and 40D according to the illustrative embodiment has. Likewise, developing cartridges 50A, 50B, 50C, and 50D might not include a second protrusion P2 that each of the developing cartridges 50A, 50B, 50C, and 50D according to the illustrative embodiment has. Such a configuration may thus reduce or prevent the cartridges from interfering with the projecting portions GS1, GS2, GS3, GS4, and GS5. Each cartridge may be guided by a corresponding one of the first guide surfaces G111, G112, G113, and G114 and the second guide surfaces G121, G122, G123, and G124.

The main body casing 2 further includes a plurality of, for example, four first marks M11, M12, M13, and M14.

The first marks M11, M12, M13, and M14 indicate respective colors corresponding to the toner colors of the respective developing cartridges 50A, 50B, 50C, and 50D. The first marks M11, M12, M13, and M14 are positioned at respective locations corresponding to the respective developing cartridges 50A, 50B, 50C, and 50D.

The stopper S6 includes a plurality of, for example, four second marks M21, M22, M23, and M24. The second marks M21, M22, M23, and M24 indicate respective colors corresponding to the toner colors of the respective developing cartridges 50A, 50B, 50C, and 50D. The second marks M21, M22, M23, and M24 are positioned at respective locations corresponding to the respective developing cartridges 50A, 50B, 50C, and 50D.

Such marks may enable a user to attach the developing cartridges 50A, 50B, 50C, and 50D to respective positions correctly.

In the illustrative embodiment, the first hollow B1 and the second hollow B2 both may be through holes penetrating the respective handles in the up-down direction. Nevertheless, in other embodiments, for example, at least one of a first hollow and a second hollow may be a recess recessed downward from above. In still other embodiments, for example, at least one of a first hollow and a second hollow may be a recess recessed upward from below. In yet other embodiments, for example, at least one of a first hollow and a second hollow may be a recess recessed from one of the sides of a handle in the second direction.

Figure 14:
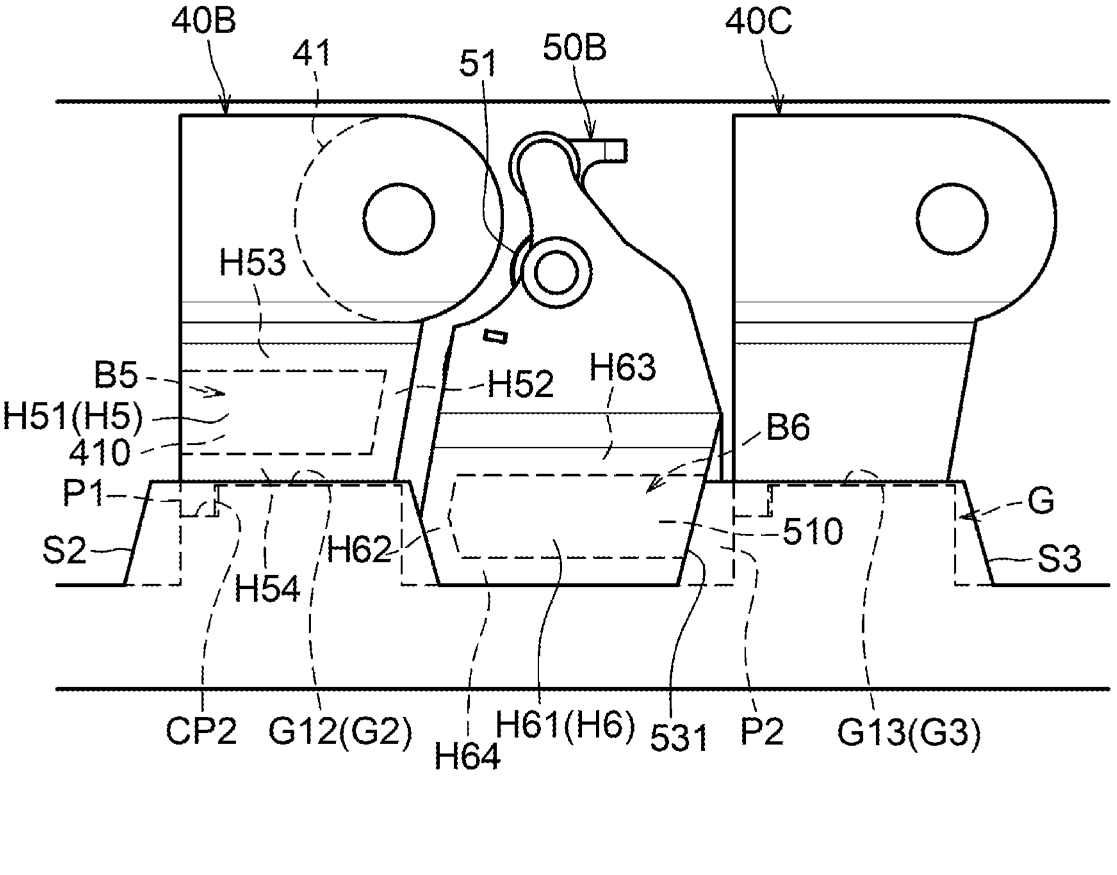
FIG. 14 illustrates a third modification of the disclosure.

More specifically, for example, in a third modification, as illustrated in FIG. 14, a first hollow B5 and a second hollow B6 both may be recesses recessed from one of sides of respective handles in the second direction. In such a case, two cartridges (e.g., the drum cartridge 40B and the developing cartridge 50B) corresponding to the same particular color may have such hollows. For example, the drum cartridge (e.g., the drum cartridge 40B) may have the first hollow B5 having an opening that may open to the side opposite to the side on which the developing cartridge (e.g., the developing cartridge 50B) is positioned in the second direction. The developing cartridge (e.g., the developing cartridge 50B) may have the second hollow B6 having an opening that may open to the side opposite to the side on which the drum cartridge (e.g., the drum cartridge 40B) is positioned in the second direction.

In other words, the first hollow B5 of the drum cartridge 40B is recessed toward the corresponding developing cartridge 50B from the side on which a drum cartridge 40A adjacent to the drum cartridge 40B is positioned in the second direction. The second hollow B6 of the developing cartridge 50B is recessed toward the corresponding drum cartridge 40B from the side on which a drum cartridge 40C adjacent to the developing cartridge 50B is positioned in the second direction.

That is, the first hollow B5 is recessed from one end of the drum cartridge 40B in the second direction toward the other end of the drum cartridge 40B in the second direction (the drum cartridge 40B includes a photosensitive drum 41 at the other end of the drum cartridge 40B in the second direction). The second hollow B6 is recessed from the other end of the developing cartridge 50B in the second direction toward the one end of the developing cartridge 50B in the second direction.

More specifically, for example, in the third modification, a first handle H5 includes a first portion H51, a second portion H52, a third portion H53, and a seventh portion H54. The first portion H51 is positioned away from a first drum outer surface 410 in the first direction. The second portion H52 connects between one end of the first portion H51 of a developing cartridge (e.g., the developing cartridge 50B) in the second direction and the first drum outer surface 410.

The third portion H53 connects between an upper end of the first portion H51 and the first drum outer surface 410.

The seventh portion H54 connects between a lower end of the first portion H51 and the first drum outer surface 410.

A second handle H6 includes a fourth portion H61, a fifth portion H62, a sixth portion H63, and an eighth portion H64. The fourth portion H61 is positioned away from a first developing outer surface 510 in the first direction. The fifth portion H62 connects between one end of the fourth portion H61 of a drum cartridge (e.g., the drum cartridge 40B) in the second direction and the first developing outer surface 510.

The sixth portion H63 connects between an upper end of the fourth portion H61 and the first developing outer surface 510. The eighth portion H64 connects between a lower end of the fourth portion H61 and the first developing outer surface 510.

According to the third modification, the first hollow B5 and the second hollow B6 have the respective openings that may open to the opposite sides to each other. Such a configuration may thus enable a user to pull the respective cartridges easily. More specifically, for example, the first hollow B5 is recessed from the one end of the drum cartridge 40B in the second direction toward the other end of the drum cartridge 40B in the second direction. Such a configuration may thus enable a user to hook a finger into the first hollow B5 from the one side of the drum cartridge 40B in the second direction. The second hollow B6 is recessed from the other end of the developing cartridge 50B in the second direction toward the one end of the developing cartridge 50B in the second direction. Such a configuration may thus enable a user to hook a finger into the second hollow B6 from the other side of the developing cartridge 50B in the second direction.

In the illustrative embodiment, the drum handle HU1 includes two recesses 421 and 431. Nevertheless, in other embodiments, for example, a drum handle may include either one of the recesses 421 and 431.

In the above-described illustrative embodiment and modifications, the disclosure has been applied to the color printer 1. Nevertheless, the disclosure is not limited to the color printer 1. In other embodiments, for example, the disclosure may be applied to other image forming apparatuses such as monochrome printers, copying machines, and multifunction devices.

The elements described in the respective illustrative embodiment or modifications may be combined to implement the disclosure.

What is claimed is:

1. A developing cartridge attachable to a main body casing of an image forming apparatus, a drum cartridge being removably insertable into the main body casing in a first direction, the drum cartridge aligned with the developing cartridge in a second direction perpendicular to the first direction in a state where the drum cartridge and the developing cartridge are attached to the main body casing, the drum cartridge including a photosensitive drum that is rotatable about a first axis extending in the first direction and a drum frame that rotatably supports the photosensitive drum, the developing cartridge comprising:

a developing roller rotatable about a second axis extending in the first direction and a developing frame configured to store developer therein;

a second handle positioned at a first developing outer surface of the developing frame in the first direction, the second handle having a second recess that is recessed upward from below to form a second hollow; and, the drum cartridge comprising:

a charger.

2. The developing cartridge according to claim 1, wherein the second handle includes:

a fourth portion being spaced apart from the first developing outer surface in the first direction;

a fifth portion extending from the first developing outer surface beyond the developing roller in the first direction, and a sixth portion extending from the first developing outer surface beyond the developing roller in the first direction, wherein the fourth portion, the fifth portion and the sixth portion cooperatively define the second recess below the fifth portion.

3. The developing cartridge according to claim 1, wherein the drum cartridge and the developing cartridge are removable from the main body casing independently of one another.

4. The developing cartridge according to claim 3, wherein the second recess is configured to allow a finger of a user to be hooked in a case where the developing cartridge is removed from the main body casing.

5. The developing cartridge according to claim 4, wherein the second recess is configured to allow the developing cartridge to lift up toward an intermediate belt of the image forming apparatus by the user in the case where the developing cartridge is removed from the main body casing.

6. The developing cartridge according to claim 1, wherein the second recess is recessed toward an intermediate transfer belt of the image forming apparatus in a state where the developing cartridge is attached to the main body casing.

7. The developing cartridge according to claim 1, wherein the second handle is positioned below the developing roller in a state where the developing cartridge is attached to the main body casing.

8. The image forming apparatus according to claim 1, wherein the developing cartridge is attached to the main body.

9. A developing cartridge attachable to a main body casing of an image forming apparatus, a drum cartridge being removably insertable into the main body casing in a first direction, the drum cartridge aligned with the developing cartridge in a second direction perpendicular to the first direction in a state where the drum cartridge and the developing cartridge are attached to the main body casing, the drum cartridge including a photosensitive drum that is rotatable about a first axis extending in the first direction and a drum frame that rotatably supports the photosensitive drum, the developing cartridge comprising:

a developing roller rotatable about a second axis extending in the first direction and a developing frame configured to store developer therein;

a second handle positioned at a first developing outer surface of the developing frame in the first direction, the second handle having a second recess that is recessed upward from below.

10. The developing cartridge according to claim 9, wherein the second handle includes:

a fourth portion being spaced apart from the first developing outer surface in the first direction;

a fifth portion extending from the first developing outer surface beyond the developing roller in the first direction, and a sixth portion extending from the first developing outer surface beyond the developing roller in the first direction, wherein the fourth portion, the fifth portion and the sixth portion cooperatively define the second recess below the fifth portion.

11. The developing cartridge according to claim 9, wherein the drum cartridge and the developing cartridge are removable from the main body casing independently of one another.

12. The developing cartridge according to claim 9, wherein the second recess is recessed toward an intermediate transfer belt of the image forming apparatus in a state where the developing cartridge is attached to the main body casing.

13. The developing cartridge according to claim 11, wherein the second recess is configured to allow a finger of a user to be hooked in a case where the developing cartridge is removed from the main body casing.

14. The developing cartridge according to claim 13, wherein the second recess is configured to allow the developing cartridge to lift up toward an intermediate belt of the image forming apparatus by the user in the case where the developing cartridge is removed from the main body casing.

15. The developing cartridge according to claim 9, wherein the second handle is positioned below the developing roller in a state where the developing cartridge is attached to the main body casing.

16. The image forming apparatus according to claim 9, wherein the developing cartridge is attached to the main body.

* * * * *